United States Patent
Pan et al.

(10) Patent No.: US 11,363,563 B2
(45) Date of Patent: Jun. 14, 2022

(54) PAGING METHOD, TERMINAL, NETWORK DEVICE, AND COMPUTER READABLE STORAGE MEDIUM

(71) Applicant: VIVO MOBILE COMMUNICATION CO., LTD., Chang'an Dongguan (CN)

(72) Inventors: Xueming Pan, Chang'an Dongguan (CN); Dajie Jiang, Chang'an Dongguan (CN); Li Chen, Chang'an Dongguan (CN); Wei Bao, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 74 days.

(21) Appl. No.: 16/632,595

(22) PCT Filed: Jun. 28, 2018

(86) PCT No.: PCT/CN2018/093331
§ 371 (c)(1),
(2) Date: Jan. 21, 2020

(87) PCT Pub. No.: WO2019/015459
PCT Pub. Date: Jan. 24, 2019

(65) Prior Publication Data
US 2021/0168759 A1    Jun. 3, 2021

(30) Foreign Application Priority Data
Jul. 21, 2017    (CN) .......................... 201710601702.9

(51) Int. Cl.
H04W 68/02    (2009.01)
H04W 52/02    (2009.01)
H04W 72/04    (2009.01)

(52) U.S. Cl.
CPC ....... *H04W 68/02* (2013.01); *H04W 52/0235* (2013.01); *H04W 72/042* (2013.01)

(58) Field of Classification Search
CPC ............. H04W 68/02; H04W 52/0235; H04W 72/042
(Continued)

(56) References Cited

U.S. PATENT DOCUMENTS

2003/0186684 A1 *  10/2003  Kearney ............... H04W 68/02
                                                       455/411
2005/0176474 A1    8/2005  Lee et al.
(Continued)

FOREIGN PATENT DOCUMENTS

CN    1784076 A    6/2006
CN    1820433 A    8/2006
(Continued)

OTHER PUBLICATIONS

Chinese First Office Action Application No. 201710601702.9; dated Dec. 20, 2019.
(Continued)

*Primary Examiner* — Inder P Mehra
(74) *Attorney, Agent, or Firm* — von Briesen & Roper, s.c.

(57) ABSTRACT

A paging method, a terminal, a network device, and a computer readable storage medium are provided. The paging method includes: transmitting, by a network device to a terminal, monitoring indication information used to indicate whether a paging message needs to be monitored or not; receiving, by the terminal the monitoring indication information transmitted by the network device and used to indicate whether the paging message needs to be monitored or not, and monitoring, by the terminal, the paging message according to the monitoring indication information.

15 Claims, 2 Drawing Sheets

Receiving monitoring indication information transmitted by a network device and configured to indicate whether a paging message needs to be monitored or not — 11

Monitoring the paging message according to the monitoring indication information — 12

(58) Field of Classification Search
USPC .......................................................... 370/311
See application file for complete search history.

(56) References Cited

U.S. PATENT DOCUMENTS

| | | | |
|---|---|---|---|
| 2006/0111127 A1 | 5/2006 | Jang | |
| 2008/0205348 A1* | 8/2008 | Malladi | H04L 1/1607 370/335 |
| 2009/0286532 A1 | 11/2009 | Nigam et al. | |
| 2012/0122495 A1 | 5/2012 | Weng et al. | |
| 2013/0155954 A1* | 6/2013 | Wang | H04W 76/27 370/328 |
| 2013/0258919 A1* | 10/2013 | Damnjanovic | H04W 52/0209 370/311 |
| 2014/0004850 A1* | 1/2014 | Kwon | H04W 68/02 455/423 |
| 2014/0321381 A1* | 10/2014 | Guo | H04W 52/0216 370/329 |
| 2015/0358841 A1 | 12/2015 | Wang | |
| 2018/0324765 A1* | 11/2018 | Nammi | H04W 72/121 |
| 2018/0352416 A1* | 12/2018 | Ryu | H04W 4/70 |
| 2019/0312711 A1* | 10/2019 | Stern-Berkowitz | H04L 1/0046 |

FOREIGN PATENT DOCUMENTS

| | | |
|---|---|---|
| CN | 101064930 A | 10/2007 |
| CN | 101309435 A | 11/2008 |
| CN | 101483811 A | 7/2009 |
| CN | 101577886 A | 11/2009 |
| CN | 101909242 A | 12/2010 |
| CN | 103796286 A | 5/2014 |
| CN | 105307203 A | 2/2016 |
| CN | 105493591 A | 4/2016 |
| WO | WO 2014/181981 A1 | 11/2004 |

OTHER PUBLICATIONS

Chinese Second Office Action Application No. 201710601702.9; dated Apr. 8, 2020.
European Search Report Application No. 18835775.0; dated Jul. 2, 2020.
International Search Report & Written Opinion dated Application No. PCT/CN2018/093331; dated Sep. 3, 2018.
Huawei, Hisilicon; "On 'wake-up signal' for eFeMTC", 3GPP TSG RAN WG1 Meeting #89, R1-1707018, Hangzhou, China, May 15, 2017-May 19, 2017.
Intel Corporation; "Analysis of impact of Wake-up signaling on power consumption and resource", 3GPP TSG RAN WG1 Meeting #89, R1-1707319, Hangzhou, P.R. China, May 15, 2017-May 19, 2017.
Guangdong Oppo Mobile Telecom; "Considerations on the DL power reduction for feNB-IoT", 3GPP TSG RAN WG1 Meeting 89, R1-1707690, Hangzhou, P.R. China, May 15, 2017-May 19, 2017.
Apple Inc.; "Control indicator in Group—common PDCCH for UE Power Saving", 3GPP TSG-RAN WG1 NR#2, R1-1710907, Qingdao, China, Jun. 27, 2017-Jun. 30, 2017.

* cited by examiner

PAGING METHOD, TERMINAL, NETWORK DEVICE, AND COMPUTER READABLE STORAGE MEDIUM

CROSS-REFERENCE TO RELATED APPLICATION

This application is a U.S. national phase application of a PCT Application No. PCT/CN2018/093331 filed on Jun. 28, 2018, which claims priority to a Chinese Patent Application No. 201710601702.9, filed in China on Jul. 21, 2017, the disclosure of which is incorporated herein by reference in its entirety.

TECHNICAL FIELD

The present disclosure relates to the field of communication technology, and in particular to a paging method, a terminal, a network device, and a computer readable storage medium.

BACKGROUND

In a mobile communication system, a network device needs to issue a paging message periodically, and a user equipment (or terminal) establishes a service connection by monitoring the paging message. In a Long Term Evolution (LTE) system, the user equipment (UE) detects a Physical Downlink Control Channel (PDCCH) only at a resource position corresponding to a Paging Frame (PF) and a Paging Occasion (PO) calculated based on a User Equipment identifier (UE ID), thereby receiving the paging message on a resource indicated by the PDCCH.

In a LIE system, the UE performs a PDCCH blind detection in a subframe in which a paging is received, detects the PDCCH scrambled by a Paging Radio Network Temporary. Identity (P-RNTI), and decodes a corresponding scheduled Physical Downlink Share Channel (PDSCH) and acquires the Paging message therein. The Paging message includes an indication of whether a user is paged or not and a cause for being paged etc.

In a related art, a terminal in an idle state still needs to be woken up periodically, to attempt to receive the Paging message transmitted by a network device. A process of attempting to receive the paging message includes: blindly detecting the PDCCH scrambled by the P-RNTI, receiving and decoding PDSCH data information scheduled by the PDCCH, and delivering the decoded PDSCH data information to a higher layer for parsing the paging message. In addition, before the terminal attempts to receive the paging message, a synchronization signal transmitted by the network device also needs to be received to achieve time-frequency synchronization with the network device. In this way, in a case that the terminal is in the idle state, the terminal also needs to be woken up periodically to attempt to receive the paging message, but a paging message is not necessarily transmitted in each reception attempt, which results in an increased power consumption of a terminal in the idle state.

SUMMARY

The present disclosure provides a paging method, a terminal, a network device, and a computer readable storage medium.

In a first aspect, a paging method is provided by some embodiments of the present disclosure. The paging method is applied to a terminal side and includes: receiving monitoring indication information transmitted by a network device, wherein the monitoring indication information is used to indicate whether a paging message needs to be monitored or not; and monitoring the paging message according to the monitoring indication information.

In a second aspect, a terminal is provided by some embodiments of the present disclosure. The terminal includes: a reception module, used to receive monitoring indication information transmitted by a network device, wherein the monitoring indication information is used to indicate whether a paging message needs to be monitored or not; and a monitoring module, used to monitor the paging message according to the monitoring indication information.

In a third aspect, a terminal is provided by some embodiments of the present disclosure. The terminal includes: a storage and a processor, wherein a computer program executable by the processor is stored in the storage, and in a case that the computer program is executed by the processor, the processor implements steps of the paging method as described above in the first aspect.

In a fourth aspect, a computer readable storage medium is provided by some embodiments of the present disclosure. The computer readable storage medium includes: a computer program stored on the computer readable storage medium, wherein when the computer program is executed by a processor, the processor implements steps of the paging method as described above in the first aspect.

In a fifth aspect, a paging method is provided by some embodiments of the present disclosure. The paging method is applied to a network device side and includes: transmitting monitoring indication information to one or more terminals, wherein the monitoring indication information is used to indicate whether a paging message needs to be monitored or not.

In a sixth aspect, a network device is provided by some embodiments of the present disclosure. The network device includes: a transmission module, used to transmit monitoring indication information to one or more terminals, wherein the monitoring indication information is used to indicate whether a paging message needs to be monitored or not.

In a seventh aspect, a network device is provided by some embodiments of the present disclosure. The network device includes: a storage and a processor, wherein a computer program executable by the processor is stored in the storage, and in a case that the computer program is executed by the processor, the processor implements steps of the paging method as described above in the fifth aspect.

In an eighth aspect, a computer readable storage medium is provided by some embodiments of the present disclosure. The computer readable storage medium includes: a computer program stored on the computer readable storage medium, wherein when the computer program is executed by a processor, the processor implements steps of the paging method as described above in the fifth aspect.

BRIEF DESCRIPTION OF THE DRAWINGS

In order to more clearly illustrate technical solutions in some embodiments of the present disclosure, drawings used in description of some embodiments of the present disclosure will be briefly introduced below. Obviously, the drawings in the following description are only some embodiments of the present disclosure. Based on these drawings, other drawings may be obtained by those skilled in the art without paying any creative effort.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments described herein. Rather, these embodiments are provided so that the present disclosure will be thorough and complete, and will fully convey the scope of the present disclosure to those skilled in the art.

Such terms as "first", "second", and the like in the specification and claims of the present disclosure are used to distinguish similar objects, but are not necessarily used to describe a particular order or a chronological order. It is to be understood that terms used in this way may be interchangeable under appropriate circumstances, so that the embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices.

A paging method, a terminal, a network device and a computer readable storage medium provided by the present disclosure may solve a problem in the related art that a high power consumption of a terminal in an idle state is caused as a result of the terminal periodically attempting to receive a paging message.

Figure 1:
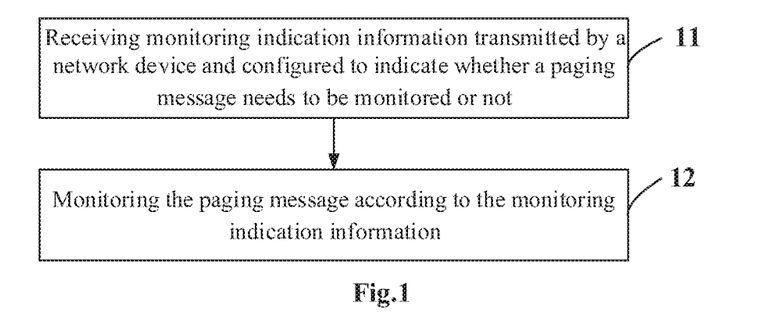
FIG. 1 is a schematic flowchart of a paging method at a terminal side according to some embodiments of the present disclosure.

As shown in FIG. 1, some embodiments of the present disclosure provide a paging method applied at a terminal side. The paging method specifically includes the following steps 11-12.

Step 11: receiving monitoring indication information transmitted by a network device and used to indicate whether a paging message needs to be monitored or not.

The terminal (UE) receives the monitoring indication information transmitted by the network device, so as to be informed of whether it is necessary to attempt to receive a paging message at one or more paging occasions or not.

Step 12: monitoring the paging message according to the monitoring indication information.

In a case that the monitoring indication information indicates that the paging message needs to be monitored, the terminal attempts to receive the paging message at a corresponding paging occasion. In a case that the monitoring indication information indicates that the paging message needs not to be monitored, the terminal abandons monitoring of the paging message when the corresponding paging occasion arrives, so as to reduce a monitoring power consumption of the terminal.

Specifically, the Step 12 includes: blindly detecting a physical downlink control channel (PDCCH) scrambled by a paging radio network temporary identity in a case that the monitoring indication information indicates that the paging message needs to be monitored; receiving and decoding data information transmitted on a physical downlink share channel (PDSCH) scheduled by the physical downlink control channel; and delivering the decoded data information to a higher layer for parsing the paging message, to obtain the corresponding paging message. That is, in a case that the monitoring indication information received by the terminal indicates that the terminal needs to monitor the paging message at the paging occasion, the PDCCH scrambled by the P-RNTI is detected blindly, data blocks on the PDSCH scheduled by the PDCCH is received and decoded, the decoded data information is delivered to a higher layer for parsing the paging message, to attempt to acquire the corresponding paging message.

The Step 12 further includes: abandoning monitoring of the paging message in a case that the monitoring indication information indicates that the paging message needs not to be monitored. That is, in a case that the monitoring indication information received by the terminal indicates that the terminal does not need to monitor the paging message at the paging occasion, the terminal abandons a process of attempting to monitor the paging message at the paging occasion, so as to reduce the monitoring power consumption of the terminal.

The Step 11 may be specifically implemented by the following steps: receiving, via a physical layer control channel, the monitoring indication information transmitted by the network device and used to indicate whether a paging message needs to be monitored or not. In other words, the monitoring indication information is transmitted via the physical layer control channel, i.e., the network device provides the monitoring indication information via the physical layer control channel, and the terminal receives the monitoring indication information via the physical layer control channel.

Optionally, the Step 11 may also include the following step: receiving, through first M time-domain transmission units in a transmission resource corresponding to a paging occasion for the terminal, the monitoring indication information transmitted by the network device and used to indicate whether a paging message needs to be monitored or not, wherein the M is an integer greater than or equal to 1. The time-domain transmission unit is a subframe, a slot, a mini slot or a time-domain transmission symbol (e.g., an OFDM symbol). In other words, the monitoring indication information may be transmitted in a first subframe, a first slot, a first mini slot, or a first time-domain transmission symbol (e.g., an OFDM symbol) in the paging occasion for the terminal, or may be transmitted in the first M subframes, time slots, mini slots, or orthogonal frequency division multiplexing (OFDM) symbols of the paging occasion for the terminal.

Optionally, the Step 11 may also include the following step: receiving, through a specific time-domain transmission unit before a transmission resource corresponding to a paging occasion for the terminal, the monitoring indication information transmitted by the network device and used to indicate whether a paging message needs to be monitored or not. The specific time-domain transmission unit refers to a certain subframe, a certain slot, a certain mini slot or a certain OFDM symbol before the transmission resource corresponding to the paging occasion for the terminal, in other words, the monitoring indication information may be transmitted in a certain subframe, a certain slot, a certain mini slot or a certain OFDM symbol before the paging occasion for the terminal.

Further, the monitoring indication information is received for one time at each paging occasion for the terminal, or is received for one time at a plurality of paging occasions for the terminal. That is, the terminal receives the monitoring indication information at each paging occasion, or the terminal receives the monitoring indication information for one time at a plurality of paging occasions. Correspondingly, the monitoring indication information is used to indicate whether a paging message needs to be monitored at a current paging occasion or not, or is used to indicate whether the paging message needs to be monitored at next N paging occasions or not, wherein the N is an integer greater than or equal to 1. Specifically, in a case that the monitoring indication information indicates whether the paging message needs to be monitored at the current paging occasion or not, the terminal needs to receive the monitoring indication information for one time at each paging occasion, so as to be informed of whether the paging message needs to monitored at the current paging occasion or not. In a case that the monitoring indication information indicates whether the paging message needs to be monitored at the next N paging occasions or not, the terminal may receive the monitoring indication information at each paging occasion, or receive the monitoring indication information at the first paging occasion among the next N paging occasions, so as to be informed of whether the paging message is required to monitored at the next N paging occasions or not.

Further, the monitoring indication information is carried in control information carried in a physical downlink control channel, or the monitoring indication information is carried in control information carried in a physical layer signal or a physical layer sequence having a preset format. That is, the monitoring indication information may be physical layer control information, or another physical layer signal format, such as a specific signal or a specific sequence, etc. Therefore, the Step 11 specifically includes: detecting control information carried in a physical downlink control channel transmitted by the network device, or detecting the control information carried in the physical layer signal or the physical layer sequence in the preset format transmitted by the network device, so as to acquire the monitoring indication information used to indicate whether a paging message needs to be monitored or not.

Specifically, the physical downlink control channel includes a specific physical downlink control channel (specific PDCCH) and a group common physical downlink control channel (group common PDCCH). In a case that the monitoring indication information is carried in the control information carried in the physical downlink control channel, the Step 11 may be implemented through the following step: detecting, according to a time-frequency resource configured by a network, a corresponding specific physical downlink control channel to acquire the monitoring indication information used to indicate whether a paging message needs to be monitored or not. Since the PDCCH is a terminal-specific PDCCH, the monitoring indication information received by the terminal only indicates whether the terminal needs to monitor the paging message or not, i.e., the network device transmits the monitoring indication information to different terminals via different PDCCHs.

Further, the Step 11 may also be implemented through the following steps: determining, according to a time-frequency resource configured by a network, a corresponding group common physical downlink control channel; and detecting, in Downlink Control Information (DCI) carried in the group common physical downlink control channel, one or more indication bits corresponding to the terminal or corresponding to a group in which the terminal is grouped, so as to acquire the monitoring indication information used to indicate whether a paging message needs to be monitored or not. Since the PDCCH is the group common PDCCH, the monitoring indication information for a plurality of terminals is carried in the PDCCH, the terminal needs to detect, in the DCI carried in the PDCCH, the one or more indication bits corresponding to the terminal itself, or corresponding to the group in which the terminal itself is grouped, so as to be informed of whether the paging message needs to monitored or not. That is, a network device transmits the monitoring indication information to a plurality of terminals via the group common PDCCH. The plurality of terminals here may be a plurality of terminals in the same group or a plurality of terminals in different groups. The DCI carried in the group common PDCCH includes a plurality of different indication bits, and the different indication bits correspond to different groups, or correspond to different terminals in the same group. In this way, by transmitting the monitoring indication information via the group common PDCCH, the network device may transmit the monitoring indication information to a plurality of terminals simultaneously by transmitting the PDCCH for one time, which may reduce the number of PDCCH transmissions to a certain extent and reduce a network overhead, In the paging method of some embodiments of the present disclosure, the terminal receives the monitoring indication information transmitted by the network device, and further monitors the paging message according to the indication of the monitoring indication information, that is, in a case that the monitoring indication information indicates that monitoring is required, a paging message is monitored; in a case that the monitoring indication information indicates that monitoring is not required, monitoring of the paging message is abandoned, to reduce the power consumption of the terminal when monitoring the paging.

The above embodiments describe the paging method at the terminal side in different scenarios, and a terminal corresponding to the paging method at the terminal side will be further described below with reference to the drawings.

Figure 2:
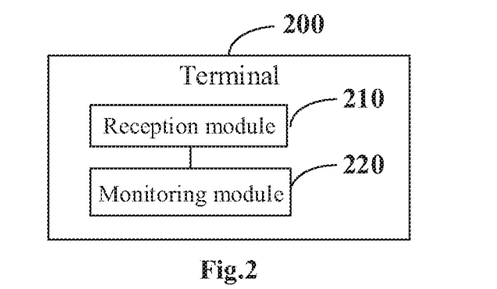
FIG. 2 is a structural schematic diagram of modules of a terminal according to some embodiments of the present disclosure.

As shown in FIG. 2, some embodiments of the present disclosure provide a terminal 200. The terminal 200 may implement details of the method in the above embodiments including receiving monitoring indication information transmitted by a network device and used to indicate whether a paging message needs to be monitored or not, and monitoring the paging message according to the monitoring indication information, and the same effect is achieved, the terminal 200 specifically includes a reception module 210 and a monitoring module 220.

The reception module 210 is used to receive monitoring indication information transmitted by a network device and used to indicate whether a paging message needs to be monitored or not. The monitoring module 220 is used to monitor the paging message according to the monitoring indication information.

The reception module 210 includes: a first reception unit, used to receive, via a physical layer control channel, the monitoring indication information transmitted by the network device and used to indicate whether a paging message needs to be monitored or not.

The reception module 210 includes: a second reception unit 210, used to receive, through first M time-domain transmission units in a transmission resource corresponding to a paging occasion for the terminal, the monitoring indication information transmitted by the network device and used to indicate whether a paging message needs to be monitored or not, wherein the M is an integer greater than or equal to 1; or a third reception unit, used to receive, through a specific time-domain transmission unit before a transmission resource corresponding to the paging occasion for the terminal, the monitoring indication information transmitted by the network device and used to indicate whether a paging message needs to be monitored or not.

The time-domain transmission unit is a subframe, a slot or an OFDM symbol.

The monitoring indication information is received for one time at each paging occasion, or is received for one time at a plurality of paging occasions.

The monitoring indication information is used to indicate whether the paging message needs to be monitored at a current paging occasion or not, or is used to indicate whether the paging message needs to be monitored at next N paging occasions or not, wherein the N is an integer greater than or equal to 1.

The monitoring module 220 includes one or more or all of following units: a blind detection module, used to blindly detect a physical downlink control channel scrambled by a paging radio network temporary identity in a case that the monitoring indication information indicates that the paging message needs to be monitored; a processing unit, used to receive and decode data information transmitted in a physical downlink share channel scheduled by the physical downlink control channel; and a parsing unit, used to deliver the decoded data information to a higher layer for parsing the paging message to acquire the corresponding paging message.

The terminal 200 further includes a processing module, used to abandon monitoring of the paging message in a case that the monitoring indication information indicates that the paging message needs not to be monitored.

The monitoring indication information is carried in control information carried in a physical downlink control channel, or the monitoring indication information is carried in control information carried in a physical layer signal or a physical layer sequence having a preset format.

Optionally, the reception module 210 includes: a first detection unit, used to detect, according to a time-frequency resource configured by a network, a corresponding specific physical downlink control channel to acquire the monitoring indication information used to indicate whether a paging message needs to be monitored or not, in a case that the monitoring indication information is carried in the control information carried in the physical downlink control channel.

Optionally, the reception module 210 includes at least one of the following units: a determination unit, used to determine, according to a time-frequency resource configured by a network, a corresponding group common physical downlink control channel, in a case that the monitoring indication information is carried in control information carried in a physical downlink control channel; a second detection unit, used to detect, in Downlink Control Information (DCI) carried in the group common physical downlink control channel, one or more indication bits corresponding to the terminal or corresponding to a group in which the terminal is grouped, so as to acquire the monitoring indication information used to indicate whether a paging message needs to be monitored or not.

It should be noted that, the terminal of some embodiments of the present disclosure, receives the monitoring indication information transmitted by the network device, and further monitors the paging message according to the indication of the monitoring indication information. That is, in a case that the monitoring indication information indicates that monitoring is required, a paging message is monitored; in a case that the monitoring indication information indicates that monitoring is not required, monitoring of the paging message is abandoned, to reduce the power consumption of the terminal when monitoring the paging.

In order to better achieve the foregoing objective, some embodiments of the present disclosure farther provides a terminal. The terminal includes a storage and a processor, wherein a computer program executable by the processor is stored in the storage, and in a case that the computer program is executed by the processor, the processor implements steps of the paging method at a terminal side described as above.

Some embodiments of the present disclosure further provides a computer readable storage medium storing therein a computer program, wherein when the computer program is executed by a processor, the processor implements steps of the paging method at a terminal side described as above. The computer readable storage medium herein may be a volatile computer readable storage medium or a non-volatile computer readable storage medium. The non-volatile computer readable storage medium may be a Read-Only Memory (ROM), a Programmable ROM (PROM), an Erasable PROM (EPROM), or an Electrically EPROM (EEPROM) or a flash memory. The volatile computer readable storage medium may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM).

Figure 3:
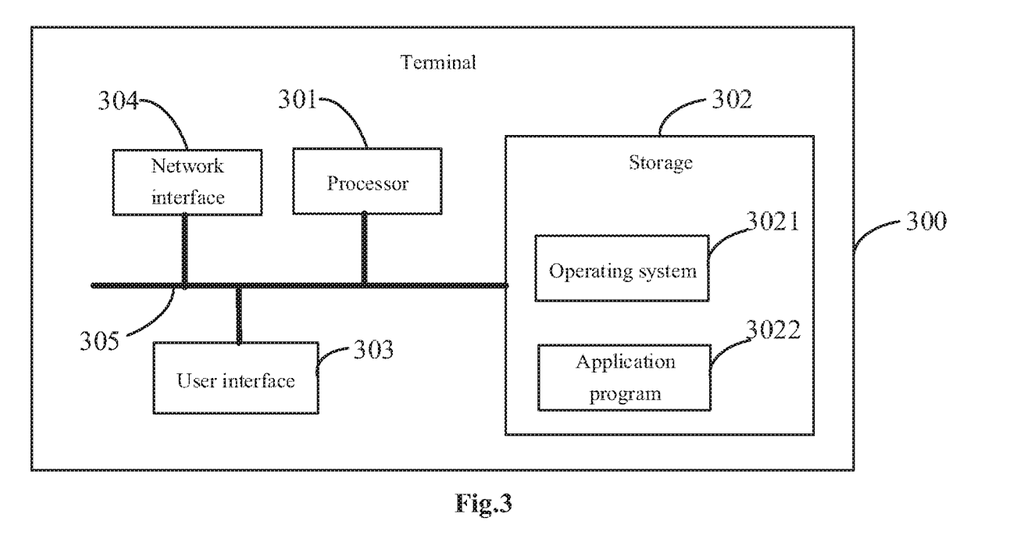
FIG. 3 is a structural block diagram of a terminal according to some embodiments of the present disclosure.

Specifically, FIG. 3 is a structure diagram illustrating a terminal 300 according to some embodiments of the present disclosure. The terminal 300 shown in FIG. 3 includes: at least one processor 301, a storage 302, a user interface 303 and a network interface 304. The various components in the terminal 300 are coupled together by a bus system 305. It will be appreciated that the bus system 305 is used to implement connection communication among these components. The bus system 305 includes a power bus, a control bus, a data bus and a status signal bus. However, for clarity of description, various buses are labeled as the bus system 305 in FIG. 10.

The user interface 303 may include a display or a pointing device (e.g., a touchpad or a touch screen, etc.).

It is to be understood that the storage 302 in some embodiments of the present disclosure may be either a volatile storage or a non-volatile storage, or may include both the volatile storage and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 302 of the systems and methods described in the present disclosure is intended to include, but is not limited to, these and any other suitable types of storages.

In some embodiments, the storage 302 stores the following elements, an executable module or a data structure, or a subset thereof, or an extended set thereof: an operating system 3021 and an application program 3022.

The operating system 3021 includes various system programs, such as a framework layer, a core library layer, a driver layer, and the like, for implementing various basic services and processing hardware-based tasks. The application program 3022 includes various application programs, such as a Media Player, a Browser, and the like, for implementing various application services. A program for implementing the methods of some embodiments of the present disclosure may be included in the application program 3022.

In some embodiments of the present disclosure, the terminal 300 further includes: a computer program stored in the storage 303 and executable on the processor 301, specifically, which may be a computer program in the application program 3022. When the computer program is executed by the processor 301, the processor 301 implements the following steps: receiving monitoring indication information transmitted by a network device and used to indicate whether a paging message needs to be monitored or not; and monitoring the paging message according to the monitoring indication information.

The above method disclosed in some embodiments of the present disclosure may be applied to the processor 301 or implemented by the processor 301. The processor 301 may be an integrated circuit chip having a processing capability of signals. In the implementation process, each step of the foregoing method may be completed by an integrated logic circuit in hardware of the processor 301 or by an instruction in a form of software. The processor 301 may be a general-purpose processor, a Digital Signal Processor (DSP), an Application Specific Integrated Circuit (ASIC), a Field Programmable Gate Array (FPGA), or other programmable logic device, a discrete gate or a transistor logic device, or a discrete hardware component. Various methods, steps, and logical block diagrams disclosed in some embodiments of the present disclosure may be implemented or carried out. The general purpose processor may be a microprocessor, any conventional processor or the like. The steps of the method disclosed in some embodiments of the present disclosure may be embodied directly by a hardware decoding processor, or by a combination of hardware and software modules in the hardware decoding processor. A software module may be located in a conventional storage medium known in the art such as a random access memory, a flash memory, a read only memory, a programmable read only memory or an electrically erasable programmable memory, a register, and the like. The storage medium is located in the storage 302, and the processor 301 reads information in the storage 302 and completes the steps of the above method in combination with hardware of the processor 301.

It is to be understood that the paging method at a terminal side and the embodiment of the terminal 200 described herein may be implemented in hardware, software, firmware, middleware, microcode, or any combination thereof. For a hardware implementation, each module or each unit may be implemented within one or more Application Specific Integrated Circuits (ASICs), Digital Signal Processors (DSPs), Digital Signal Processing Devices (DSP Devices, DSPDs), Programmable Logic Devices (PLDs), Field-Programmable Gate Arrays (FPGAs), general processors, controllers, micro-controllers, microprocessors, other electronic units designed to perform functions described in the present application, or a combination thereof.

For software implementation, techniques described herein may be implemented by modules (e.g., processes, functions, etc.) that perform the functions described herein. A software code may be stored in the storage and executed by the processor. The storage may be implemented within the processor or external to the processor.

Specifically, when the computer program is executed by the processor 301, the processor 301 implements the following step: receiving, via a physical layer control channel, the monitoring indication information transmitted by the network device and used to indicate whether a paging message needs to be monitored or not.

Specifically, when the computer program is executed by the processor 301, the processor 301 implements the following step: receiving, through first M time-domain transmission units in a transmission resource corresponding to a paging occasion for the terminal, the monitoring indication information transmitted by the network device and used to indicate whether a paging message needs to be monitored or not, wherein the M is an integer greater than or equal to 1; or receiving, through a specific time-domain transmission unit before a transmission resource corresponding to a paging occasion for the terminal, the monitoring indication information transmitted by the network device and used to indicate whether a paging message needs to be monitored or not; wherein the time-domain transmission unit is a subframe, a slot or an OFDM symbol.

Specifically, the monitoring indication information is received for one time at each paging occasion, or is received for one time at a plurality of paging occasions.

Specifically, the monitoring indication information is used to indicate whether the paging message needs to be monitored at a current paging occasion or not, or is used to indicate whether the paging message needs to be monitored at next N paging occasions or not, wherein the N is an integer greater than or equal to 1.

Specifically, when the computer program is executed by the processor 301, the processor 301 implements the following step: detecting control information carried in a physical downlink control channel transmitted by the network device, or detecting the control information carried in a physical layer signal or a physical layer sequence having a preset format transmitted by the network device to acquire the monitoring indication information used to indicate whether a paging message needs to be monitored or not.

Specifically, when the computer program is executed by the processor 301, the processor 301 implements one or more or all of the following steps: blindly detecting, in a case that the monitoring indication information indicates that the paging message needs to be monitored, a physical downlink control channel scrambled by a paging radio network temporary identity; receiving and decoding data information transmitted in a physical downlink share channel scheduled by the physical downlink control channel; and delivering the decoded data information to a higher layer for parsing the paging message, to acquire the corresponding paging message.

Specifically, when the computer program is executed by the processor 301, the processor 301 implements the following step: abandoning monitoring of the paging message in a case that the monitoring indication information indicates that the paging message needs not to be monitored.

Specifically, the monitoring indication information is carried in control information carried in a physical downlink control channel, or the monitoring indication information is carried in control information carried in a physical layer signal or a physical layer sequence having a preset format.

Specifically, in a case that the monitoring indication information is carried in the control information carried in the physical downlink control channel, when the computer program is executed by the processor 301, the processor 301 implements the following step: detecting, according to a time-frequency resource configured by a network, a corresponding specific physical downlink control channel to acquire the monitoring indication information used to indicate whether a paging message needs to be monitored or not.

Specifically, in a case that the monitoring indication information is carried in the control information carried in the physical downlink control channel, when the computer program is executed by the processor 301, the processor 301 implements the following step: determining, according to a time-frequency resource configured by a network, a corresponding group common physical downlink control channel; and detecting, in Downlink Control Information (DCI) carried in the group common physical downlink control channel, one or more indication bits corresponding to the terminal or corresponding to a group in which the terminal is grouped, to acquire the monitoring indication information used to indicate whether a paging message needs to be monitored or not.

The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a Radio Access Network (RAN), and the wireless terminal may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network. For example, a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal may also be referred to as a system, a Subscriber Unit, a Subscriber Station, a Mobile Station, a Mobile, a Remote Station, a Remote Terminal, an Access Terminal, a User Terminal, a User Agent, or a User Device or a User Equipment, which are not limited here.

The terminal of some embodiments of the present disclosure, receives the monitoring indication information transmitted by the network device, and further monitors the paging message according to the indication of the monitoring indication information. That is, in a case that the monitoring indication information indicates that monitoring is required, a paging message is monitored; in a case that the monitoring indication information indicates that monitoring is not required, monitoring of the paging message is abandoned, to reduce the power consumption of the terminal when monitoring the paging.

The above embodiments introduce the paging method of the present disclosure at the terminal side, and the present disclosure will further introduce the paging method at a network device side with reference to the accompanying drawings.

Figure 4:
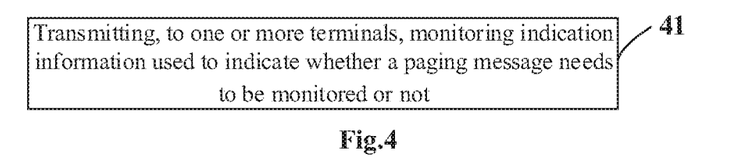
FIG. 4 is a schematic flowchart of a paging method at a network device side according to some embodiments of the present disclosure.

As shown in FIG. 4, some embodiments of the present disclosure provide a paging method applied at a network device side, the paging method specifically includes the following step 41.

Step 41: transmitting, to one or more terminals, monitoring indication information used to indicate whether a paging message needs to be monitored or not.

The network device transmits the monitoring indication information to the one or more terminals, so that each of the one or more terminals determines, according to the monitoring indication information, whether to monitor the paging message or not. Specifically, the one or more terminals attempt to monitor the paging message only in a case that the monitoring indication information indicates that monitoring is required, which may reduce monitoring power consumption of the one or more terminals to a certain extent.

Specifically, the Step 41 includes: transmitting, to one or more terminals via a physical layer control channel, the monitoring indication information used to indicate whether a paging message needs to be monitored or not. In other words, the monitoring indication information is transmitted via the physical layer control channel, i.e., the network device provides the monitoring indication information via the physical layer control channel, and each of the one or more terminals receives the monitoring indication information via the physical layer control channel.

Optionally, the Step 41 is implemented through the following step: transmitting, to the one or more terminals through first M time-domain transmission units in a transmission resource corresponding to a paging occasion for the one or more terminals, the monitoring indication information used to indicate whether a paging message needs to be monitored or not. The M is an integer greater than or equal to 1, wherein the time-domain transmission unit is a subframe, a slot, a mini slot or a time-domain transmission symbol (e.g., an OFDM symbol). In other words, the monitoring indication information may be transmitted in the first subframe, the first slot, the first mini slot, or the first time-domain transmission symbol (e.g., an OFDM symbol) of the paging occasion for the one or more terminals, or may be transmitted in the first M subframes, the first M time slots, the first M mini slots, or the first M orthogonal frequency division multiplexing (OFDM) symbols of the paging occasion for the one or more terminals one or more terminals.

Optionally, the Step 41 may also be implemented through the following step:

transmitting, to the one or more terminals through a specific time-domain transmission unit before a transmission resource corresponding to a paging occasion for the one or more terminals, the monitoring indication information used to indicate whether a paging message needs to be monitored or not. The specific time-domain transmission unit refers to a certain subframe, a certain slot, a certain mini slot or a certain OFDM symbol before a transmission resource corresponding to the paging occasion for the one or more terminals, in other words, the monitoring indication information may be transmitted in a certain subframe, a certain slot, a certain mini slot or a certain OFDM symbol before the paging occasion for the one or more terminals.

Further, the monitoring indication information is transmitted for one time at each paging occasion for the one or more terminals, or is transmitted for one time at a plurality of paging occasions of the one or more terminals. That is, the network device transmits the monitoring indication information for one time at each paging occasion for the one or more terminals, or the network device transmits the monitoring indication information for one time at a plurality of paging occasions for the one or more terminals. Correspondingly, the monitoring indication information is used to indicate whether the one or more terminals need to monitor the paging message at a current paging occasion or not, or is used to indicate whether the one or more terminals need to monitor the paging message at next N paging occasions or not, wherein the N is an integer greater than or equal to 1. Specifically, in a case that the monitoring indication information indicates whether the one or more terminals need to monitor the paging message at the current paging occasion or not, the network device needs to transmit the monitoring indication information for one time at each paging occasion for the one or more terminals, to make the one or more terminals be informed of whether to monitor the paging message at the current paging occasion or not. In a case that the monitoring indication information indicates whether the one or more terminals need to monitor the paging message at the next N paging occasions or not, the network device may transmit the monitoring indication information at each paging occasion for the one or more terminals, or transmit the monitoring indication information at the first paging occasion among the next N paging occasions for the one or more terminals, to make the one or more terminals be informed of whether to monitor the paging message at the next N paging occasions or not.

Further, the monitoring indication information is carried in control information carried in a physical downlink control channel, or the monitoring indication information is carried in control information carried in a physical layer signal or a physical layer sequence having a preset format. That is, the monitoring indication information may be physical layer control information, or another physical layer signal format, such as a specific signal or a specific sequence, etc. Therefore, the network device may transmit a PDCCH or a specific signal or a specific sequence to the one or more terminals, to indicate whether the one or more terminals need to monitor the paging message or not.

Specifically, in a case that the monitoring indication information is carried in the control information carried in the physical downlink control channel, the Step 41 includes: transmitting, to a terminal via a specific physical downlink control channel, monitoring indication used to indicate whether a paging message needs to be monitored or not; or transmitting, to a plurality of terminals via a group common physical downlink control channel, the monitoring indication information used to indicate whether a paging message needs to be monitored or not; wherein the plurality of terminals are terminals in a same group, or in different groups.

Further, prior to the step of transmitting, to a plurality of terminals via a group common physical downlink control channel, the monitoring indication information used to indicate whether a paging message needs to be monitored or not, the method further includes: grouping the plurality of terminals into a plurality of groups according to International Mobile Subscriber Identification numbers of the plurality of terminals. That is, the grouping of the terminals is determined by a preset rule, and the preset rule is related to the International Mobile Subscriber Identification Numbers (IMSIs) of one or more terminals.

Specifically, the network device may transmit the monitoring indication information to the plurality of terminals in the same group via a group common PDCCH, or may transmit the monitoring indication information to the plurality of terminals in different groups via a group common PDCCH. Further, the network device may also transmit the monitoring indication information to the plurality of terminals in different groups via a plurality of group common PDCCHs.

In a case that the plurality of terminals are terminals in different groups, prior to the step of transmitting, to a plurality of terminals via a group common physical downlink control channel, the monitoring indication information used to indicate whether a paging message needs to be monitored or not, the method further includes: allocating, for the plurality of terminals in different groups, the group common physical downlink control channels at different time-frequency resource positions and/or the group common physical downlink control channels having different radio network temporary identities. In this way, the monitoring indication information is transmitted to the plurality of terminals in different groups via the PDCCHs at different time-frequency resource positions, that is, the terminals in different groups monitor the group common PDCCHs at different time-frequency resource positions. Optionally, the monitoring indication information is transmitted to the plurality of terminals in different groups via the PDCCHs having different radio network temporary identities RNTIs, that is, the terminals in different groups monitor different RNTIs of the group common PDCCHs.

Specifically, in a case that the plurality of terminals are in a same group, Downlink Control Information (DCI) carried in the group common physical downlink control channel includes a plurality of indication bits, wherein different indication bits indicate whether different terminals need to monitor the paging message or not. That is, the plurality of terminals in the same group monitor the same group common PDCCH, but monitor the indication bits at different positions in the DCI carried in the same group common PDCCH, and the terminal may determine a position, where the monitoring indication information of the terminal is located, of the one or more indication bits of the DCI information according to a preset rate, wherein the preset rule may be obtained according to the IMSI of the terminal and based on calculation. For example, in a case that the DCI carrying the monitoring indication information includes 16 bits, the monitoring indication information of 16 terminals may be included, and each terminal corresponds to 1-bit information used to indicate whether the terminal needs to monitor the paging message or not. Further, in a case that the corresponding indication bit is detected to be 1, the terminal needs to monitor the paging message; in a case that the corresponding indication bit is detected to be 0, monitoring of the paging message is abandoned.

In a case that the plurality of terminals are terminals in different groups, Downlink Control Information (DCI) carried in the group common physical downlink control channel includes a plurality of indication bits, wherein different indication bits indicate whether the plurality of terminals in different groups need to monitor the paging message or not. That is, the plurality of terminals in different groups monitor the same group common PDCCH, but monitor indication bits in different positions in the DCI carried in the same group common PDCCH, and the terminal may determine a position, where the monitoring indication information for the group in which the terminal is grouped, of the one or more indication bits of the DCI information according to a preset rule, wherein the preset rule may be obtained according to the IMSI of the terminal and based on calculation. For example, in a case that the DCI carrying the monitoring indication information includes 16 bits, the monitoring indication information for 16 terminals may be included in the DCI, and each group of terminals corresponds to 1-bit information to indicate whether a terminal in the group need to monitor the paging message or not. Further, in a case that the corresponding indication bit is detected to be 1, the terminals in the corresponding group need to monitor the paging message; in a case that the corresponding indication hit is detected to be 0, monitoring of the paging message is terminated.

It should be noted that, in a case that the plurality of terminals are terminals in different groups, the plurality of terminals in different groups may monitor the same group common PDCCH, i.e., the plurality of terminals in different groups monitor the same time-frequency resource position or the same RNTI of the group common PDCCH, in other words, the terminals in different groups may detect the group common PDCCH at the same time-frequency resource position or with the same RNTI. The plurality of terminals in different groups may also monitor different group common PDCCHs, that is, the terminals in different groups monitor different time-frequency resource positions or different RNTIs of group common PDCCHs.

In the paging method of some embodiments of the present disclosure, the network device transmits, to the one or more terminals, the monitoring indication information used to indicate whether a paging message needs to be monitored or not, so that the one or more terminals monitor the paging message according to the indication of the monitoring indication information, that is, in a case that the monitoring indication information indicates that monitoring is required, a paging message is monitored; in a case that the monitoring indication information indicates that monitoring is not required, monitoring of the paging message is abandoned, to reduce power consumption of the one or more terminals when monitoring the paging.

The above embodiments respectively introduce the paging method at the network device side in different scenarios in detail, and the present disclosure will further introduce a network device corresponding to the paging method at the network device side below with reference to the accompanying drawings.

Figure 5:
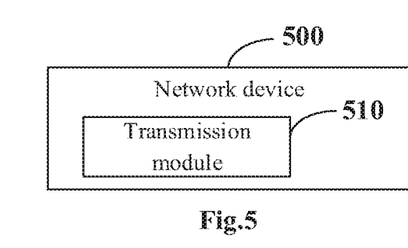
FIG. 5 is a structural schematic diagram of modules of a network device according to some embodiments of the present disclosure.

As shown in FIG. 5, some embodiments of the present disclosure provide a network device 500. The network device 500 may implement details of the method in the above embodiments including transmitting, to one or more terminals, monitoring indication information used to indicate whether a paging message needs to be monitored or not, and the same effect is achieved. The network device 500 specifically includes a transmission module 510, used to transmit, to one or more terminals, monitoring indication information used to indicate whether a paging message needs to be monitored or not.

The transmission module 510 includes: a first transmission unit, used to transmit, to the one or more terminals via a physical layer control channel, the monitoring indication information used to indicate whether a paging message needs to be monitored or not.

The transmission module 510 includes: a second transmission unit, used to transmit, to the one or more terminals through first M time-domain transmission units in a transmission resource corresponding to a paging occasion for the one or more terminals, the monitoring indication information used to indicate whether the paging message needs to be monitored or not, wherein the M is an integer greater than or equal to 1; or a third transmission unit, used to transmit, to the one or more terminals through a specific time-domain transmission unit before a transmission resource corresponding to the paging occasion for the one or more terminals, the monitoring indication information used to indicate whether the paging message needs to be monitored or not; wherein the time-domain transmission unit is a subframe, a slot or an OFDM symbol.

The monitoring indication information is transmitted for one time at each paging occasion for the one or more terminals, or is transmitted for one time at a plurality of paging occasions for the one or more terminals.

The monitoring indication information is used to indicate whether the paging message needs to be monitored at a current paging occasion or not, or is used to indicate whether the paging message needs to be monitored at next N paging occasions or not, wherein the N is an integer greater than or equal to 1.

The monitoring indication information is carried in control information carried in a physical downlink control channel, or the monitoring indication information is carried in control information carried in a physical layer signal or a physical layer sequence having a preset format.

The transmission module 510 further includes: a fourth transmission unit, used to transmit, to a terminal via a specific physical downlink control channel in a case that the monitoring indication information is carried in the control information carried in the physical downlink control channel, a monitoring indication used to indicate whether a paging message needs to be monitored or not; or a fifth transmission unit, used to transmit, to a plurality of terminals via a group common physical downlink control channel, a monitoring indication used to indicate whether a paging message needs to be monitored or not; wherein the plurality of terminals are in a same group, or in different groups.

The network device 500 further includes: a configuration module used to, in a case that the plurality of terminals are in different groups, allocate, for the plurality of terminals in different groups, group common physical downlink control channels at different time-frequency resource positions and/or with different radio network temporary identities.

In a case that the plurality of terminals are in a same group, Downlink Control Information (DCI) carried in the group common physical downlink control channel includes a plurality of indication bits, wherein different indication bits indicate whether different terminals need to monitor the paging message or not.

In a case that the plurality of terminals are in different groups, Downlink Control Information (DCI) carried in the group common physical downlink control channel includes a plurality of indication bits, wherein different indication bits indicate whether the plurality of terminals in different groups need monitor the paging message or not.

The network device 500 further includes: a grouping module, used to group the terminals into a plurality of groups according to international mobile subscriber identification numbers of the terminals.

It should be noted that, the network device of some embodiments of the present disclosure, transmits, to the one or more terminals, the monitoring indication information used to indicate whether a paging message needs to be monitored or not, so that the one or more terminals monitor the paging message according to the indication of the monitoring indication information, that is, in a case that the monitoring indication information indicates that monitoring is required, a paging message is monitored; in a case that the monitoring indication information indicates that monitoring is not required, monitoring of the paging message is abandoned, to reduce the power consumption of the one or more terminals when monitoring the paging.

It should be noted that a division for modules of the above network device and the terminal is only a division for logical functions. In actual implementation, all or part of the modules may be integrated into one physical entity, may be physically separated. These modules may all be implemented in a form of software called by a processing component, or may all be implemented in the form of hardware; some of the modules may be implemented in the form of software called by a processing component, and some of the modules may be implemented in the form of hardware. For example, a module may be a processing component provided independently, or may be integrated in one chip of the above-mentioned devices, furthermore, or may be stored in a storage of the above device in a form of program codes, functions of the above determination module may be called and executed by one processing component of the above device. Implementation of other modules is similar to that of the determination module. In addition, all or part of these modules may be integrated or implemented independently. The processing components described herein may be an integrated circuit having a processing capability of signals. In an implementation process, each step of the above method or each of the above modules may be achieved by an integrated logic circuit of hardware in the processor component or by an instruction in a form of software.

For example, embodiments of the above paging method at the network device side and the network device 500 may be one or more integrated circuits used to implement the above method, such as one or more Application Specific Integrated Circuits (ASICs), or one or more Digital Signal Processors (DSP), or, one or more Field Programmable Gate Arrays (FPGAs), etc. As another example, when one of the above modules is implemented in the form of program codes scheduled by a processing component, the processing component may be a general purpose processor, such as a Central Processing Unit (CPU) or another processor capable of calling the program codes. As another example, these modules may be integrated and implemented in the form of a system-on-a-chip (SOC).

In order to better achieve the foregoing objective, an embodiment of the present disclosure further provides a network device. The network device includes a storage and a processor, wherein a computer program executable by the processor is stored in the storage, and in a case that the computer program is executed by the processor, the processor implements steps of the paging method described as above.

An embodiment of the present disclosure further provides a computer readable storage medium storing therein a computer program, wherein when the computer program is executed by a processor, the processor implements steps of the paging method at a network device side described as above. The computer readable storage medium herein may be a volatile computer readable storage medium or a non-volatile computer readable storage medium. The non-volatile computer readable storage medium may be a Read-Only Memory (ROM), a Programmable ROM (PROM), an Erasable PROM (EPROM), or an Electrically EPROM (EEPROM) or a flash memory. The volatile computer readable storage medium may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM).

Figure 6:
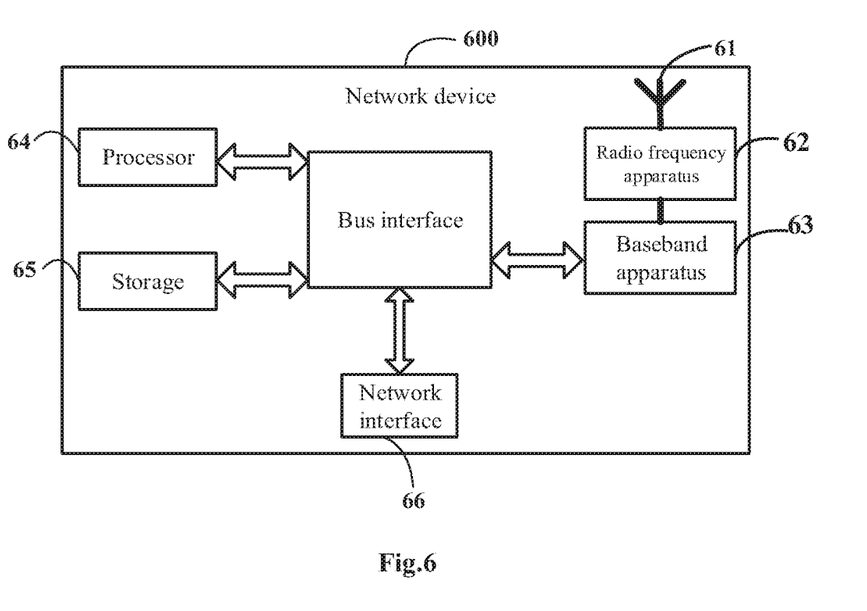
FIG. 6 is a structural block diagram of a network device according to some embodiments of the present disclosure.

Specifically, an embodiment of the present disclosure further provides a network device. As shown in FIG. 6, the network device 600 includes: an antenna 61, a radio frequency apparatus 62, and a baseband apparatus 63. The antenna 61 is connected to the radio frequency apparatus 62. In an uplink direction, the radio frequency apparatus 62 receives information through the antenna 61 and transmits the received information to the baseband apparatus 63 for processing. In a downlink direction, the baseband apparatus 63 processes information to be transmitted and transmits the processed information to be transmitted to the radio frequency apparatus 62, and the radio frequency apparatus 62 processes the received information and transmits the processed received information via the antenna 61.

The above-described frequency band processing apparatus may be located in the baseband apparatus 63, and the method performed by the network device in the above embodiment may be implemented in the baseband apparatus 63, and the baseband apparatus 63 includes a processor 64 and a storage 65.

The baseband apparatus 63 may include, for example, at least one baseband board on which a plurality of chips are disposed, as shown in FIG. 6, one of the chips is, for example, the processor 64. The processor 64 is coupled to the storage 65 to call a program in the storage 65 to perform an operation of the network device shown in the above method embodiment.

The baseband apparatus 63 may further include a network interface 66 for interacting information with the radio frequency apparatus 62, and the interface is, for example, a common public wireless interface (CPRI).

The processor herein may be one processor or a collective name of multiple processing elements. For example, the processor may be a CPU, an ASIC, or one or more integrated circuits used to implement the methods performed by the above network devices, such as one or more microprocessor DSPs, or one or more Field Programmable Gate Arrays (FPGAs), and the like. The storage element may be a storage or a collective name for multiple storage elements.

The storage 65 may be either a volatile storage or a non-volatile storage, or may include both the volatile storage and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 65 described herein is intended to include, but is not limited to, these and any other suitable types of storages.

Specifically, the network device of some embodiments of the present disclosure further includes a computer program stored in the storage 65 and executable by the processor 64; in a case that the processor 64 invokes the computer program in the storage 65, the processor 64 executes the method implemented by various modules shown in FIG. 5.

Specifically, in a case that the computer program is invoked by the processor 64, the processor 64 may execute: transmitting, to one or more terminals, monitoring indication information used to indicate whether a paging message needs to be monitored or not.

Specifically, in a case that the computer program is invoked by the processor 64, the processor 64 may execute:

transmitting, to one or more terminals via a physical layer control channel, the monitoring indication information used to indicate whether a paging message needs to be monitored or not.

Specifically, in a case that the computer program is invoked by the processor 64, the processor 64 may execute: transmitting, to the one or more terminals through first M time-domain transmission units in a transmission resource corresponding to a paging occasion for the one or more terminals, the monitoring indication information used to indicate whether the paging message needs to be monitored or not, wherein the M is an integer greater than or equal to 1; or transmitting, to the one or more terminals through a specific time-domain transmission unit before a transmission resource corresponding to the paging occasion for the one or more terminals, the monitoring indication information used to indicate whether the paging message needs to be monitored or not; wherein the time-domain transmission unit is a subframe, a slot or an OFDM symbol.

Specifically, the monitoring indication information is transmitted for one time at each paging occasion for the one or more terminals, or is transmitted for one time at a plurality of paging occasions of the one or more terminals.

Specifically, the monitoring indication information is used to indicate whether the paging message needs to be monitored at a current paging occasion or not, or is used to indicate whether the paging message needs to be monitored at next N paging occasions or not, wherein the N is an integer greater than or equal to 1.

Specifically, the monitoring indication information is carried in control information carried in a physical downlink control channel, or the monitoring indication information is carried in control information carried in a physical layer signal or a physical layer sequence having a preset format.

Specifically, in a case that the monitoring indication information is carried in the control information carried in the physical downlink control channel, and when the computer program is invoked by the processor 64, the processor 64 may execute: transmitting, to a terminal via a specific physical downlink control channel, the monitoring indication information used to indicate whether a paging message needs to be monitored or not; or transmitting, to a plurality of terminals via a group common physical downlink control channel, the monitoring indication information used to indicate whether a paging message needs to be monitored or not; wherein the plurality of terminals are in a same group, or in different groups.

Specifically, in a case that the plurality of terminals are in different groups, and when the computer program is invoked by the processor 64, the processor 64 may execute: allocating, for the plurality of terminals in different groups, group common physical downlink control channels at different time-frequency resource positions and/or with different radio network temporary identities.

Specifically, in a case that the plurality of terminals are in a same group, Downlink Control Information (DCI) carried in the group common physical downlink control channel includes a plurality of indication bits, wherein different indication bits indicate whether different terminals need to monitor the paging message or not.

Specifically, in a case that the plurality of terminals are in different groups, Downlink Control Information (DCI) carried in the group common physical downlink control channel includes a plurality of indication bits, wherein different indication bits indicate whether the plurality of terminals in different groups need to monitor the paging message or not.

Specifically, in a case that the computer program is invoked by the processor 64, the processor 64 may execute: grouping the plurality of terminals into a plurality of groups according to international mobile subscriber identification numbers of the plurality of terminals.

The network device may be a Base Transceiver Station (BTS) in a Global System of Mobile communication (GSM) or a Code Division Multiple Access (CDMA), or may be a base station (NodeB (NB)) in a Wideband Code Division Multiple Access (WCDMA), or may also be an Evolutional Node B (eNB or eNodeB) in a Long Term Evolution (LTE) or a relay station or an access point, or a base station in a future Fifth Generation (5G) communication network, etc., which is not limited here.

The network device of some embodiments of the present disclosure, transmits, to the one or more terminals, the monitoring indication information used to indicate whether a paging message needs to be monitored or not, so that the one or more terminals monitor the paging message according to the indication of the monitoring indication information, that is, in a case that the monitoring indication information indicates that monitoring is required, a paging message is monitored; in a case that the monitoring indication information indicates that monitoring is not required, monitoring of the paging message is abandoned, to reduce power consumption of the one or more terminals when monitoring the paging.

Those of ordinary skills in the art will appreciate that elements and algorithm steps of the various examples described in the embodiments disclosed in the present disclosure may be implemented by electronic hardware or a combination of computer software and electronic hardware. Whether these functions are performed in hardware or in software depends on a specific application and design constraints of the solution. A person skilled in the art may use different methods to implement the described functions for each particular application, but such implementation should not be considered to be beyond the scope of the present disclosure.

A person skilled in the art may clearly understand that for the convenience and brevity of the description, a specific working process of the system, the device and the unit described above may be obtained by referring to a corresponding process in the foregoing method embodiment, and details are not described herein again.

In an embodiment provided by the present application, it should be noted that, the disclosed method and device may be implemented in other means. For example, the device embodiments described above are merely illustrative. For example, a division of units is only a division in respect of logical functions. In actual implementation, there may be additional division manner, for example, a plurality of units or components may be combined or may be integrated into another system, or some features may be ignored or not be executed. In addition, a mutual coupling or direct coupling or communication connection shown or discussed may be an indirect coupling or a communication connection through some interfaces, devices or units, and may be in an electrical, mechanical or other form.

Units described as separate components may or may not be physically separated, and components displayed as units may or may not be physical units, that is, may be located in one place, or may be distributed at multiple network units. Some or all of the units may be selected based on actual needs to achieve the purpose of the scheme of the embodiment.

In addition, various functional units in various embodiments of the present disclosure may be integrated into one processing unit, or each unit may exist physically separately, or two or more units may be integrated into one unit.

If the functions are implemented in the form of software functional units and sold or used as an independent product, the software functional units may also be stored in a computer readable storage medium. Based upon such understanding, technical solutions of the present disclosure essentially or the part of the present disclosure contributing to the prior art or a part of the technical solution may be embodied in the form of a computer program product which may be stored in a storage medium and which includes several instructions to cause a computer device (which may be a personal computer, a server, or a network device, etc.) to perform all or some steps of the method according to respective embodiments of the present disclosure. The foregoing storage medium includes various media that may store program codes, such as a USB flash drive, a removable hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents to the present disclosure. Also, the steps of performing the above-described series of processes may naturally be performed in chronological order in the order illustrated, but not necessarily be required to be performed in the chronological order, and some steps may be performed in parallel or independently of each other. It will be appreciated by those skilled in the art that all or any of the steps or the components of the methods and devices of the present disclosure may be implemented in any computing device (including a processor, a storage medium, etc.) or any computing device network through hardware, firmware, software, or a combination thereof. This may be implemented by those of ordinary skills in the art using their basic programming skills after they read the description of the present disclosure.

Accordingly, the objective of the present disclosure may also be achieved by running a program or a set of programs on any computing device. The computing device may be a well-known general purpose device. Accordingly, the objective of the present disclosure may also be realized by merely providing a program product including program codes for implementing the method or the device. That is to say, such a program product also constitutes the present disclosure, and a storage medium storing such a program product also constitutes the present disclosure. It will be apparent that the storage medium may be any known storage medium or any storage medium developed in the future. In addition, it should be noted that in the device and the method of the present disclosure, it is apparent that various components or various steps may be decomposed and/or recombined. The decomposition and/or recombination should be considered as equivalents to the present disclosure. Also, the steps of performing the above-described series of processes may naturally be performed in a chronological order in the order illustrated, but not necessarily be required to be performed in the chronological order. Certain steps may be performed in parallel or independently of one another.

The descriptions above are optional embodiments of the disclosure, it should be noted that the improvements and the embellishments without departing from the principle of the present disclosure may also be made by those of ordinary skills in the art. These improvements and embellishments are also within the protection scope of the present disclosure.

What is claimed is:

1. A paging method, applied to a terminal side and comprising:

receiving monitoring indication information transmitted by a network device, wherein the monitoring indication information is used to indicate whether a paging message needs to be monitored or not; and monitoring the paging message according to the monitoring indication information;

wherein, the monitoring indication information is received for one time at each paging occasion, or is received for one time at a plurality of paging occasions; or, the monitoring indication information is further used to indicate whether the paging message needs to be monitored at a current paging occasion or not, or is further used to indicate whether the paging message needs to be monitored at next N paging occasions or not, wherein the N is an integer greater than or equal to 1, wherein, the monitoring the paging message according to the monitoring indication information comprises:

blindly detecting, in a case that the monitoring, indication information indicates that the paging message needs to be monitored, a physical downlink control channel scrambled by a paging radio network temporary identity;

receiving and decoding data information transmitted in a physical downlink share channel scheduled by the physical downlink control channel; and delivering the decoded data information to a higher layer for parsing the paging message, to acquire a corresponding paging message.

2. The paging method according to claim 1, wherein receiving the monitoring indication information transmitted by the network device comprises:

receiving, via a physical layer control channel, the monitoring indication information transmitted by the network device.

3. The paging method according to claim 1, wherein receiving the monitoring indication information transmitted by the network device comprises:

receiving, through first M time-domain transmission units in a transmission resource corresponding to a paging occasion for the terminal, the monitoring indication information transmitted by the network device, wherein the M is an integer greater than or equal to 1; or receiving, through a specific time-domain transmission unit before a transmission resource corresponding to the paging occasion for the terminal, the monitoring indication information transmitted by the network device;

wherein the time-domain transmission unit is a subframe, a slot or an Orthogonal Frequency Division Multiplexing OFDM symbol.

4. The paging method according to claim 1, wherein, after receiving the monitoring indication information transmitted by the network device, the paging method further comprises:

abandoning monitoring of the paging message in a case that the monitoring indication information indicates that the paging message needs not to be monitored.

5. The paging method according to claim 1, wherein, the monitoring indication information is carried in control information carried in a physical downlink control channel, or the monitoring indication information is carried in control information carried in a physical layer signal or a physical layer sequence having a preset format.

6. The paging method according to claim 5, wherein, in a case that the monitoring indication information is carried in the control information carried in the physical downlink control channel, receiving the monitoring indication information transmitted by the network device comprises:

detecting, according to a time-frequency resource configured by a network, a corresponding specific physical downlink control channel to acquire the monitoring indication information.

7. The paging method according to claim 5, wherein, in a case that the monitoring indication information is carried in the control information carried in the physical downlink control channel, receiving the monitoring indication information transmitted by the network device comprises:

determining, according to a time-frequency resource configured by a network, a corresponding group common physical downlink control channel; and     detecting, in Downlink Control Information (DCI) carried in the group common physical downlink control channel, one or more indication bits corresponding to the terminal or corresponding to a group in which the terminal is grouped, to acquire the monitoring indication information.

8. A terminal, comprising:

a storage and a processor, wherein a computer program executable by the processor is stored in the storage, and in a case that the computer program is executed by the processor, the processor implements following steps:

receiving monitoring indication information transmitted by a network device, wherein the monitoring indication information is used to indicate whether a paging message needs to be monitored or not; and monitoring the paging message according to the monitoring indication information; wherein, the monitoring indication information is received for one time at each paging occasion, or is received for one time at a plurality of paging occasions;

or, the monitoring indication information is further used to indicate whether the paging message needs to be monitored at a current paging occasion or not, or is further used to indicate whether the paging message needs to be monitored at next N paging occasions or not, wherein the N is an integer greater than or equal to 1;

wherein the processor further implements following steps:

blindly detecting, in a case that the monitoring indication information indicates that the paging message needs to be monitored, a physical downlink control channel scrambled by a paging radio network temporary identity;

receiving and decoding data information transmitted in a physical downlink share channel scheduled by the physical downlink control channel; and delivering the decoded data information to a higher layer for parsing the paging message, to acquire a corresponding paging message.

9. A paging method, applied to a network device side and comprising:

transmitting monitoring indication information to one or more terminals, wherein the monitoring indication information is used to indicate whether a paging message needs to be monitored or not;

wherein the monitoring indication information is transmitted for one time at each paging occasion for the one or more terminals, or is transmitted for one time at a plurality of paging occasions for the one or more terminals;

or, the monitoring indication information is further used to indicate whether the paging message needs to be monitored at a current paging occasion or not, or is further used to indicate whether the paging message needs to be monitored at next N paging occasions or not, wherein the N is an integer greater than or equal to 1;

wherein the method further comprises: transmitting data information in a physical downlink share channel scheduled by a physical downlink control channel.

10. The paging method according to claim 9, wherein, transmitting the monitoring indication information to the one or more terminals, comprises:

transmitting the monitoring indication information to the one or more terminals through first M time-domain transmission units in a transmission resource corresponding to a paging occasion for the one or more terminals, wherein the M is an integer greater than or equal to 1; or transmitting the monitoring indication information to the one or more terminals through a specific time-domain transmission unit before a transmission resource corresponding to the paging occasion for the terminal;

wherein the time-domain transmission unit is a subframe, a slot or an OFDM symbol.

11. The paging method according to claim 9, wherein the monitoring indication information is carried in control information carried in a physical downlink control channel, or the monitoring indication information is carried in control information carried in a physical layer signal or a physical layer sequence having a preset format.

12. The paging method according to claim 11, wherein, in a case that the monitoring indication information is carried in the control information carried in the physical downlink control channel, transmitting the monitoring indication information to the one or more terminals comprises:

transmitting the monitoring indication information to a terminal via a specific physical downlink control channel; or transmitting the monitoring indication information to a plurality of terminals via a group common physical downlink control channel, wherein the plurality of terminals is in a same group, or in different groups.

13. The paging method according to claim 12, wherein, in a case that the plurality of terminals is in different groups, prior to transmitting the monitoring indication information to the plurality of terminals via the group common physical downlink control channel, the method further comprises:

allocating, for the plurality of terminals in the different groups, at least one of following (i) and (ii): (i) group common physical downlink control channels at different time-frequency resource positions and (ii) group common physical downlink control channels with different radio network temporary identities;

or, in a case that the plurality of terminals are in a same group, Downlink Control Information (DCI) carried in the group common physical downlink control channel comprises a plurality of indication bits, wherein different indication bits in the plurality of indication bits indicate whether different ones of the plurality of terminals need to monitor the paging message or not;

or, in a case that the plurality of terminals are in different groups, Downlink Control Information (DCI) carried in the group common physical downlink control channel comprises a plurality of indication bits, wherein different indication bits in the plurality of indication bits indicate whether the plurality of terminals in the different groups need to monitor the paging message or not.

14. The paging method according to claim 12, wherein, prior to transmitting the monitoring indication information to the plurality of terminals via the group common physical downlink control channel, the method further comprises:
grouping the plurality of terminals into a plurality of groups according to international mobile subscriber identification numbers of the plurality of terminals.

15. A network device, comprising:
a storage and a processor, wherein a computer program executable by the processor is stored in the storage, and in a case that the computer program is executed by the processor, the processor implements steps of the paging method according to claim 9.

* * * * *